(12) United States Patent
Buchko et al.

(10) Patent No.: US 7,716,525 B1
(45) Date of Patent: May 11, 2010

(54) LOW LATENCY, HIGH THROUGHPUT DATA STORAGE SYSTEM

(75) Inventors: Steven Buchko, Dunrobin (CA); Paul Kondrat, Kanata (CA); Shawn McAllister, Manotick (CA); Jonathan Bosloy, Kanata (CA)

(73) Assignee: Solace Systems, Inc., Ottawa, ON (CA)

( * ) Notice: Subject to any disclaimer, the term of this patent is extended or adjusted under 35 U.S.C. 154(b) by 377 days.

(21) Appl. No.: 11/781,607

(22) Filed: Jul. 23, 2007

Related U.S. Application Data

(60) Provisional application No. 60/820,151, filed on Jul. 24, 2006.

(51) Int. Cl.
 *G06F 11/00* (2006.01)
(52) U.S. Cl. .......................................... 714/22; 714/24
(58) Field of Classification Search .................... 714/22
 See application file for complete search history.

(56) References Cited

U.S. PATENT DOCUMENTS

| | | | | | |
|---|---|---|---|---|---|
| 4,603,406 | A | * | 7/1986 | Miyazaki et al. | 365/229 |
| 5,396,637 | A | * | 3/1995 | Harwell et al. | 365/228 |
| 5,828,823 | A | * | 10/1998 | Byers et al. | 714/24 |
| 5,983,265 | A | * | 11/1999 | Martino, II | 709/206 |
| 2002/0002677 | A1 | * | 1/2002 | Eade et al. | 713/164 |
| 2003/0033349 | A1 | * | 2/2003 | Lambert et al. | 709/201 |
| 2004/0193955 | A1 | * | 9/2004 | Leete et al. | 714/22 |
| 2005/0021689 | A1 | * | 1/2005 | Marvin et al. | 709/220 |
| 2005/0044447 | A1 | * | 2/2005 | Dunstan | 714/14 |
| 2005/0152286 | A1 | | 7/2005 | Betts et al. | |
| 2006/0080515 | A1 | * | 4/2006 | Spiers et al. | 711/162 |
| 2006/0092950 | A1 | * | 5/2006 | Arregoces et al. | 370/396 |
| 2006/0242458 | A1 | * | 10/2006 | Feldman et al. | 714/14 |
| 2008/0222652 | A1 | * | 9/2008 | Lambert et al. | 719/315 |

OTHER PUBLICATIONS

JMS Performance Comparison—Performance Comparison for Publish Subscribe Messaging—Prepared by Krissoft Solutions—Oct. 2004.

* cited by examiner

*Primary Examiner*—Bryce P Bonzo
(74) *Attorney, Agent, or Firm*—Marks & Clerk; Richard J. Mitchell

(57) ABSTRACT

A method of providing assured message delivery with low latency and high message throughput, in which a message is stored in non-volatile, low latency memory with associated destination list and other meta data. The message is only removed from this low-latency non-volatile storage when an acknowledgement has been received from each destination indicating that the message has been successfully received, or if the message is in such memory for a period exceeding a time threshold or if memory resources are running low, the message and associated destination list and other meta data is migrated to other persistent storage. The data storage engine can also be used for other high throughput applications.

13 Claims, 5 Drawing Sheets

LOW LATENCY, HIGH THROUGHPUT DATA STORAGE SYSTEM

CROSS REFERENCE TO RELATED APPLICATION

This application claims the benefit under 35 USC 119(e) of prior U.S. provisional application No. 60/820,151, filed Jul. 24, 2006, the contents of which are herein incorporated by reference.

FIELD OF THE INVENTION

This invention relates to generally to reliable data storage in, for example, data communication networks a high throughput is required, and in particular to a method of assured message delivery across a message delivery system with very low delivery latency and high message throughput, or other similar applications requiring non-volatile, high throughput, low latency storage of state information with redundancy.

BACKGROUND OF THE INVENTION

In the prior art, many message delivery systems exist which offer assured message delivery between endpoints, such as between different applications. Assured (sometimes also called guaranteed or persistent) message delivery offers a once and only once message delivery semantics, although other delivery semantics can also be offered as well, such as deliver at most once, deliver at least once, etc.

Such messaging systems provide for loosely coupled message delivery between the message source and the receiving application (for one-to-one delivery) or receiving applications (for one-to-many delivery). A receiving application may be offline when a message is sent, or part of the network may be unavailable at the time, and the messaging system must persist the message and deliver it to the application when it becomes available or when a communications path to it becomes available. As well, the system ensures message delivery to the receiving application even in the presence of message loss between network elements, as may occur due to events such as communications errors, power outages, etc.

Examples of prior art messaging systems are WebSphere MQ from International Business Machines Corporation and a number of implementations of the Java Messaging Service (JMS) which is known in the art.

In prior art assured delivery systems, messages can be sent by a message source to a destination message queue or to a destination topic group. A destination queue is suitable for one-to-one message delivery. Note however that multiple applications can receive messages from a destination queue, e.g. for load balancing or resiliency, but a given message is only received by one application from the queue. With publish-subscribe style message delivery, a message is published to a topic, and can be received by one or more applications that subscribe to messages from that topic. Some messaging systems such as JMS also allow for "message selectors" to allow for filtering of the messages based on matching rules on certain header fields so that an application can, for example, receive a subset of the messages from a topic based on the message selector filtering rules. Content-based routing message delivery systems also allow a message to be delivered to one or more recipients based on their subscriptions to the content of a message, as opposed to a pre-defined topic.

In order to provide assured message delivery in the face of any type of failure, including loss of power, the restart of the messaging system etc., messages must be persisted to non-volatile storage. Typically disk drives are utilized due to the large message volume and the requirement to be able to persist messages for a long period of time, e.g. when the destination for the message is not available. In order to provide for assured delivery, the message must be guaranteed to be in non-volatile storage before the message sender is sent an acknowledgement that the message has been accepted by the messaging system. The act of storing the message adds significant latency to the processing of the message at a message processing node, and even with non-volatile caches, the message latency and throughput is significantly affected by this requirement. Such non-volatile caches are typically implemented as part of the disk sub-system, for example, as part of the disk controller logic. For example, refer to U.S. Pat. No. 5,581,726.

The use of write-back cache logic, where once the data is successfully written to the non-volatile memory cache of the disk sub-system the messaging system is free to continue processing the message without waiting for the message to be written to the physical disk device(s) does reduce the message latency, but the latency is still quite high due to the significant processing necessary through the operating system and file system logic. Moreover, the messaging throughput from a relatively small number of sources is limited still by the disk write latency of the disk drives—again because the next message cannot be accepted from a sender until the previous one has been written to disk. The disk cache serves as a front-end to the disk drives, so each data write will ultimately be placed onto the disk storage media, which has a limited data write rate. The write data rate can be increased by utilizing disks in a RAID configuration, for example, as is known in the art, but the write speed will always be much slower compared to the message processing capability of the messaging system. This limits the overall assured delivery messages rate of the system.

Some messaging systems offer an option to use a lower-level of reliability, where messages are allowed to be queued in the volatile data structures of the operating system's file system (in RAM) and the message is considered to have been saved even though is may not have yet reached a non-volatile disk cache (if one is provided) or the disk itself. This option is provided to increase messages throughput and decrease message latency at the expense of reliability. With such an option, a power failure can result is messages being lost. To increase reliability, external uninterruptible power supplies can further be utilized to power the messaging system so that in the event of a power failure, the file system RAM data structures can be flushed onto the physical storage medium before the messaging system does a controlled shutdown. While this increases reliability, and performance is increased through the use of RAM buffering, the throughput is again limited ultimately by the sustained disk write speed. Moreover, the use of interruptible power supplies normally include battery technology, which need to be maintained and has a limited lifetime.

While assured delivery systems of the past were also used heavily in batch-oriented systems, where messages may be queued for long periods before being consumed by the destination application, many mission-critical systems, such as trading applications in financial services now are required to process extremely high message rates and require very low latency across the messaging system, such as much less than one millisecond. In such applications, a given message is typically only queued in the messaging system for a very short period of time, and once successfully consumed by the destination application or applications, the message no longer has to be retained by the messaging system. However, in such applications there is still a requirement for assured messaging and assurances that messages will not be lost by the messaging system (requiring every message to be written to disk).

As an example of current performance levels of the prior art, refer to "JMS Performance Comparison", October 2004, Krissoft Solutions, the contents of which are incorporated herein by reference. This study shows that for the persistent messaging benchmark, the fastest vendor surveyed, a scenario of 1 publisher, 1 subscriber and 1 topic yielded a message rate of only 1654 messages per second, and for 10 publishers, 10 subscribers and 10 topics the message rate was only 4913 messages per second. As a comparison, the same study showed that for the non-persistent messaging benchmark, a scenario of 1 publisher, 1 subscriber and 1 topic yielded a message rate of 24457 messages per second (14.7 times faster than the persistent messaging benchmark), and for 10 publishers, 10 subscribers and 10 topics the message rate was 37268 messages per second (7.6 times faster than the persistent messaging benchmark). It can be seen that there is a very large performance penalty for persistent messaging over non-persistent messaging, and at least an order of magnitude increase in the persistent messaging rate is needed, and the message latency also has to be reduced as low as possible.

It is highly desirable to provide a messaging system which can offer assured message delivery which offers the required reliability and can also offer both very low message latency and very high message throughput.

SUMMARY OF THE INVENTION

Thus in a first aspect invention provides a method of providing reliable low latency, high throughput storage of data, comprising normally storing incoming data in a high performance, low latency volatile main memory, wherein data is continually written to and retrieved from said volatile memory; continually replicating said stored data to a mate high performance low latency volatile memory so as to maintain synchronism between said main memory and said mate memory; normally supplying power to said main memory from one of one or more normal power sources; providing an independent back-up power supply with a stored energy reserve for use in the event of failure of said one or more normal power sources; providing a back-up non-volatile memory; monitoring the supply of power to said main memory from said one or more normal power sources; and upon detection of a failure in said one or more normal power sources, switching the supply of power to said main memory from said one or normal power sources to said back-up power supply, and transferring current data in said main memory to said non-volatile memory, and wherein said back-up power supply has a sufficient reserve of stored energy to permit the transfer of the contents of said main memory to said non-volatile memory.

The invention thus permits high throughput data to be stored with low latency, yet permit the high throughput that is required in, for example, an assured message delivery system, such as found in a content-routed network.

In one embodiment, the storage engine comprises a high performance, low latency volatile main memory; a memory controller for continually writing data to and retrieving data from said volatile memory; a power control unit for connection to one of one or more normal power sources for normally supplying power to said volatile main memory; an independent back-up power supply with a stored energy reserve for use in the event of failure of said one or more normal power sources connected to said power control unit; a back-up non-volatile memory; and wherein said power control unit monitors the supply of power to said main memory from said one or more normal power sources and upon detection of a failure in said one or more normal power sources, switches the supply of power to said main memory from said one or normal power sources to said back-up power supply, and initiates transfer of current data in said main memory to said non-volatile memory, and wherein said back-up power supply has a sufficient reserve of stored energy to permit the transfer of the contents of said main memory to said non-volatile memory.

In yet another aspect the invention provides a method of providing low latency, high throughput assured message delivery in a network using an non-volatile data storage engine, comprising identifying a set of destinations for a received message; storing the received message in a low-latency protected main data storage engine along with information about each destination and other meta-data associated with the message; attempting to route the message to each identified destination; awaiting an acknowledgement from each identified destination indicating that the message has been successfully received thereby; and removing the message from said memory when an acknowledgement has been received for each destination.

In a still further aspect the invention provides an assured message delivery engine for use in a network, comprising a protected low-latency main data storage engine; and a processor programmed to identify a set of destinations for a received message; store the received message in a low-latency protected main data storage engine along with information about each destination and other meta-data associated with the message; attempt to route the message to each identified destination; await an acknowledgement from each identified destination indicating that the message has been successfully received thereby; and remove the message from said data storage engine when an acknowledgement has been received for each destination.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
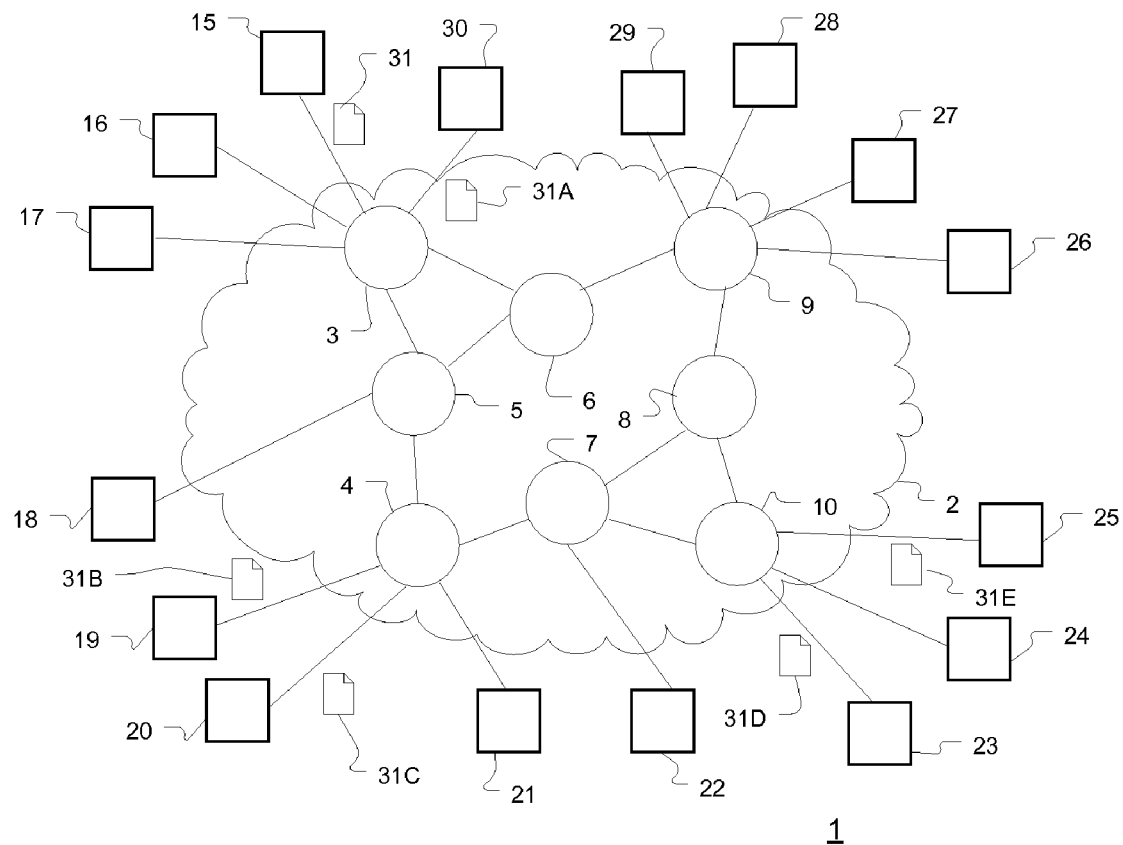
FIG. 1 shows an example message network providing assured message delivery service.

FIG. 1 shows an example system 1 which consists of a message delivery network 2 which is providing a scaleable, distributed assured message delivery service, as well as clients for the service. Network 2 consists of message delivery routers 3 through 10 which can be flexibly deployed in various different networks topologies, with an example topology shown in FIG. 1. An example of a device which can serve as a router 3 through 10 is the VRS/32 Value-Added Services Routing System from Solace Systems, Inc. Note that routers 3 through 10 may be deployed as an overlay to an underlying network, such as an IP/MPLS network, or other communications networks as is known in the art. Connected to network 2 is a plurality of messaging applications or clients 15 through 30, which may be any type of device or software which wishes to send and receive messages, with the message delivery to the one or more recipients being assured by network 2. Note that while only a small number of clients is shown, such a delivery network can support a large number of clients, such as millions, and can scale to a large number of message routers.

FIG. 1 also shows an example of a message 31 being submitted by client 15. This example message results in a copy 31A being delivered to client 30, a copy 31B being delivered to client 19, a copy 31C being delivered to client 20, a copy 31D being delivered to client 23, and a copy 31E being delivered to client 25.

The message 31 can be routed to the set of interested destinations based on destination queues or topics as is known in the art, but preferentially is routed based on the content of the message using content routing techniques. An example of a method for content routing of messages is detailed in U.S. application Ser. No. 11/012,113 (PCT application PCT/CA2004/002157), the contents of which are incorporated herein by reference. As a short summary of the routing method detailed in this reference, the inbound router 3 of FIG. 1, upon receiving message 31, determines the set of local clients interested in the message (client 30), as well as the set of remote message routers interested in the message (4 and 10). When the message is sent onwards to message router 4 and 10, a shared copy of the message may be forwarded upon common routes. In the example of network 2, the preferential route to routers 4 and 10 from router 3 is via router 5, so a single copy of message 31 is sent towards router 5, indicating a destination list of router 4 and 10. Router 5, upon receiving the message, sees that it is not in the destination list for the message, and so simply forwards the message onwards towards routers 4 and 10, with the route to both being via the link to router 4. Upon receiving the message, router 4 can immediately forward the message onwards to router 10 (via router 7), after removing itself from the destination list, and then, since router 4 appears in the destination list, router 4 can process the message for delivery to interested local clients (19 and 20). Router 7 simply forwards the message onwards to router 10. Router 10 processes the message since it is in the destination list, and will send the message to interested clients 23 and 25.

It should be noted that in addition to the distributed message delivery system 1 shown in FIG. 1, a hub-and-spoke model can also be utilized where the clients are connected to a single router (or a pair of routers for redundancy). Moreover, the message routing can be based on destination queues or topics instead of, or in addition to, content-based routing. Also note that different routing schemes can be utilized other than the example scheme described above, without affecting the applicability of this invention.

Figure 2:
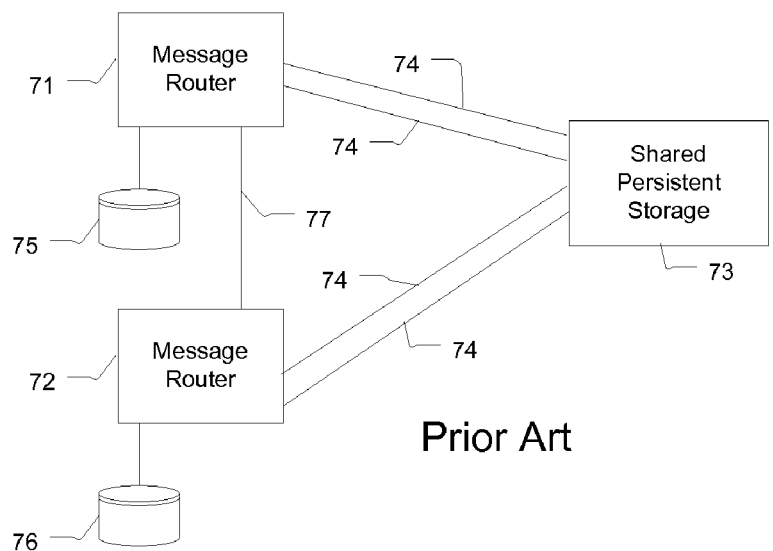
FIG. 2 shows two prior-art methods for providing storage for assured delivery.

FIG. 2 shows prior-art methods of storage for messaging for assured delivery. Message routers 71 and 72 require disk storage to temporarily store messages for which assured delivery is required. Message routers 71 and 72 act as a redundant pair, such that if one of the message routers fails, the other message router can take over the processing load. The message routers 71 and 72 preferentially operate in an active-active mode, whereby each serves a separate set of clients, but if one of the message routers fails, the other message router takes over the clients from the failed router. During such a switchover, no assured delivery messages can be lost, and any messages stored by one message router must be accessible by the other message router. Note that instead of an active-active mode, an active-standby mode could be used instead.

One method commonly utilized is to use an external shared persistent storage device 73, which may be directly connected to the message routers 71 and 72 or accessible over a Storage Area Network (SAN). Each message router 71 and 72 connects to the shared storage 73 over redundant access links 74, examples of which are Fiber Channel, Ethernet, etc. Shared storage device 73 is known in the art and available commercially from many vendors. An example of such technology is disclosed in U.S. Pat. No. 7,055,001, the contents of which are incorporated herein by reference. When message router 71 stores messages and associated delivery state on shared storage 73 and subsequently becomes unavailable, message router 72 can access this information to take over delivery responsibility for these messages (and vice versa).

Another alternative is for messages router 71 to use a local hard disk (or disks) 75 to store assured messages in progress and their associated delivery state, and for message router 72 to similarly use a local disk(s) 76 to store it's assured messages in progress and their associated delivery state. Disks 75 and 76 typically utilize techniques such as RAID, as known in the art, to increase reliability. However, should message router 71 or 72 become unavailable, the other message router must be able to access the in-progress assured messages and associated state to take over the delivery function. Thus, the two message routers 71 and 72 must communicate, over a connection 77, to replicate the in-progress messages and associated state between each other so that they can take over from each other when required. This can be done over communications link 77, which can be a link such as an Ethernet link or any other communications means. Note that link 77 can be redundant, and can be a direct connection or through an underlying network connecting the two message routers 71 and 72. This method poses an extra burden on the message routers 71 and 72 as they have to replicate the messages to each other in addition to their other processing functions. Moreover, if a message router 72 if offline or otherwise not available when message router 71 is processing messages and updating its disk 75, when message router 72 comes back on-line, message router 71 must update message router 72 with the updates that were made to disk 75 while message router 72 was not available, to allow message router 72 to update its disk 76 and bring the two message routers back to a synchronized state.

Figure 3:
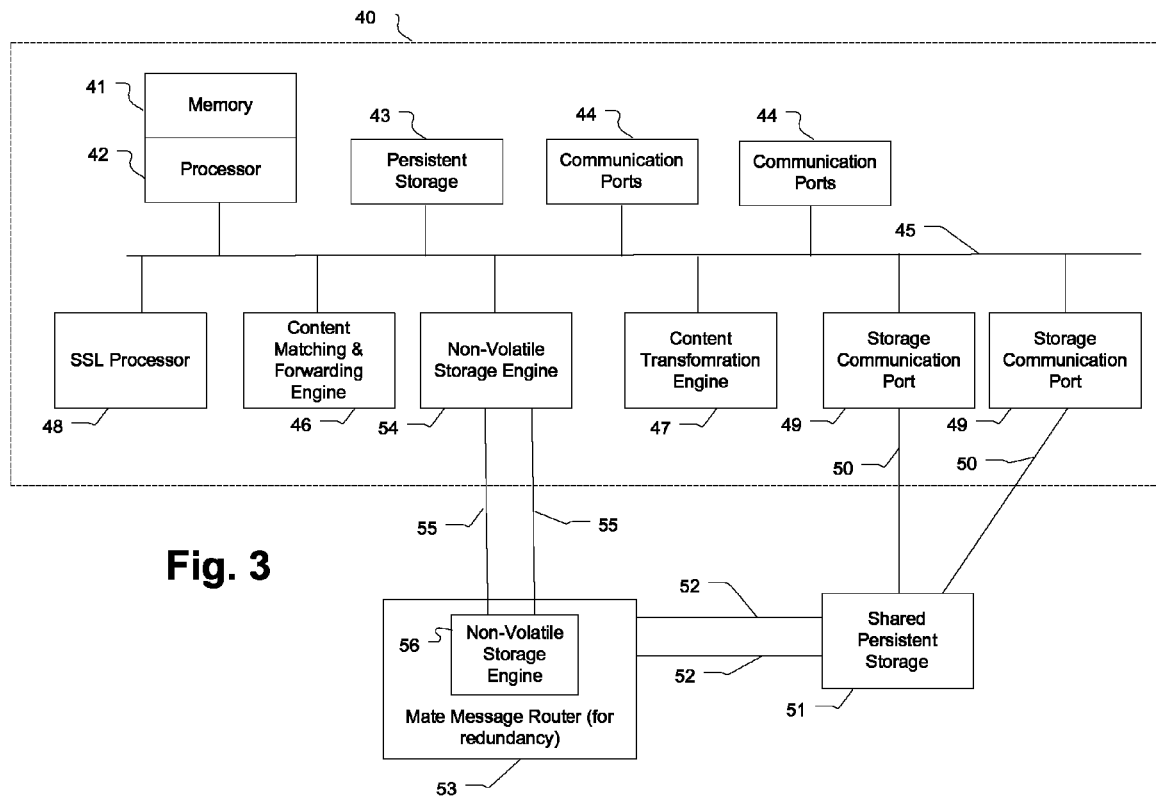
FIG. 3 shows a block diagram of a device that may be used in this invention.

FIG. 3 shows a block diagram of an exemplary device 40 (representing a device such as an individual message router from the set of 3 through 10) of the present invention, which includes a (or many) central processing unit (CPU) 42, also called a processor, with associated memory 41, persistent storage 43, a plurality of communication ports 44 (which may just do basic input/output functions, leaving the protocol processing to CPU 42, or which may have specialized processors such as networks processors or other hardware devices to do protocol processing as well, such as IP processing, UDP or TCP processing, HTTP processing, etc), and a communication bus 45. Either integrated into communications port network processors 44, or CPU 42 or a separate device off the communication bus 45 is a SSL termination processor 48. For an example application of content routing, the processor 42 is responsible for tasks such as running content routing protocols XLSP and XSMP (as per U.S. application Ser. No. 11/012,113), computing routing tables, processing received documents or messages and routing them based on content (which may involve specialized hardware assist 46 which is outside the scope of this invention), transforming the content of messages from one format to another (which may involve specialized hardware assist 47 which is outside the scope of this invention), carryout out the logic to ensure assured message delivery, which includes use of the non-volatile storage engine 54, and other router tasks known in the art. The associated memory 41 is used to hold the instructions to be executed by processor 42 and data structures such as message routing tables and protocol state. The persistent storage 43 is used to hold configuration data for the router, event logs, programs for the processor 42, as well as to hold state required for assured message delivery for longer-term storage. The persistent storage 43 may be redundant hard disks, flash memory disks or other similar devices. The communication ports 44 are the ports which the router uses to communicate with other devices, such as other routers and hosts (messaging clients). Many different technologies can be used, such as Ethernet, Token Ring, SONET, etc. The communications bus 45 allows the various router components to communicate with one another, and may be a PCI bus (with associated bridging devices) or other inter-device communication technologies known in the art, such as a switching fabric. Communications bus 45 may also be redundant.

Optionally, shared persistent storage 51, which is shared among two or more message routers which are acting to back each other up to provide redundancy, and may also be shared with other message routers, may also be utilized to provide longer-term storage of messages and state associated with assured delivery. In this case, a storage communication port 49 (or multiple for redundancy), utilizing technology such as Fiber Channel, SCSI, Ethernet, etc. is used to connect to shared persistent storage 51. An external, shared persistent storage, 51, connected over link 50 (or multiple for redundancy), can be used to store shared state, such as assured messages and their state information. Storage 51 is connected to one or more other mate message routers 53 (e.g. via link(s) 52), and thus if a message router completely fails, the shared storage 51, and the assured messages and state stored on it, is not affected.

Mate message router 53 preferentially has the same blocks as message router 40, but these details other than the mate's non-volatile storage engine 56 are not shown in FIG. 3.

If shared persistent storage 51 is not utilized, then when an assured message and its state information is written to storage 43 in a message router, the same information is preferentially synchronized with a backup message router, so that in the case of the complete failure of a message router, the backup message router can take over and continue to take care of the assured message(s) from the failed router.

Refer to U.S. application 60/696,790, the contents of which are incorporated herein by reference, for a technique of router redundancy in message routing networks.

Non-volatile storage engine 54 is used for shorter-duration persistent storage of assured delivery messages and their associated state. It provides consistent low-latency and high throughput storage. Non-volatile storage engine 54 is connected, preferentially through redundant links 55, to the mate non-volatile storage engine 56 in the mate message router 53. This allows automatic replication of assured delivery messages and associated state between the interconnected non-volatile storage engines 54 and 56.

It should be noted that instead of using two physically separate message routers 40 and 53 as shown in FIG. 3, redundancy can also be provided in an integrated system through hot-swappable cards in a chassis. For example, the message router can utilize redundant components such as redundant processing cards 42 with associated memory 41, redundant content matching and forwarding engines 46, redundant non-volatile storage engines 54 and 56, etc. Interconnect 45 itself can be a redundant interconnection fabric. Links 55 can optionally be done via the redundant interconnection fabric 45, or via dedicated interconnection lines on the system backplane. It will be understood that any discussion of a message router and a mate message router for the purposes of redundancy can also refer to redundancy provided through an integrated message router with redundant components. Shared persistent storage 51 can also be integrated into the same chassis, communicating with the rest of the system over the redundant interconnect fabric 45 or other dedicated communication channels provided on the system backplane, or be kept as an external device.

Figure 4:
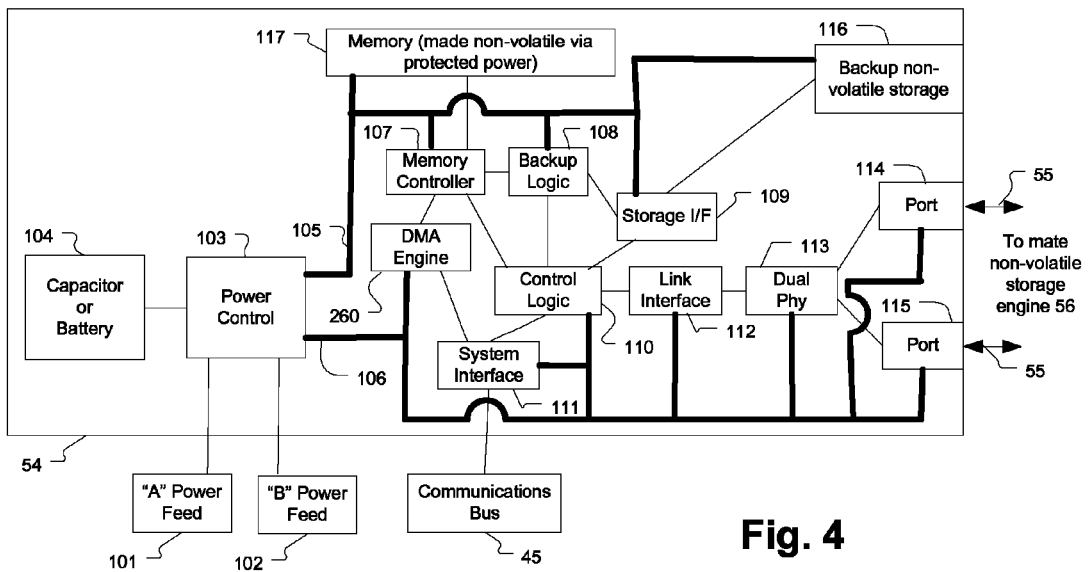
FIG. 4 is a block diagram of the non-volatile storage engine.

FIG. 4 shows a block diagram of the non-volatile storage engine 54. The purpose of the non-volatile storage engine 54 is to provide a very low-latency and high throughput non-volatile memory with automatic information replication to the mate non-volatile storage engine, and to provide off-loading of some of the state management associated with maintaining assured messages and associated state in non-volatile memory.

Power is provided to non-volatile storage engine 54 through redundant power feeds 101 and 102. Note that a single power feed only may be utilized to non-volatile storage engine 54, and redundant power supplies could be externally OR'ed together to supply this single feed, or a non-redundant feed could be utilized. These power feeds 101 and 102 are normally used to power all circuitry on non-volatile storage engine 54. Power control unit 103 accepts power feeds 101 and 102, monitors the feeds to detect if both feeds have failed, and adapt the power feeds to the voltages needed by the various circuitries on the card. Associated with power control unit 103 is a backup power supply 104, which preferentially is a high capacity capacitor (or a group of capacitors), such as supercapacitor or an ultracapacitor. In place of a capacitor, a re-chargeable battery can be utilized. Power control unit 103 provides charging circuitry for backup power supply 104, as well as can accept power from backup power supply 104 when both feeds 101 and 102 have failed. Power control unit 103 provides two sets of power outputs to the reset of the circuitry, a non-protected power feed 106 and a protected power feed 105. Non-protected power feed 106 is used to power circuitry which is not required to function when the power feeds 101 or 102 have failed, while protected power feed 105 is used to power circuitry which must continue to function when power feeds 101 and 102 have both failed. Non-protected power feed 106 is only powered from power feed 101 or 102. Protected power feed 105 is powered from power feed 101 or 102, and when both 101 and 102 have failed, is powered from backup power supply 104. Units memory 117, memory controller 107, backup logic 108, storage interface 109, and backup non-volatile storage 116 are powered from protected power feed 105, and the other blocks are powered from non-protected power feed 106. Note that other units can optionally be powered from protected backup feed 105 in place of non-protected power feed 106, with a result in a shorter duration of the backup power being available due to the increased power loading.

It should be noted that capacitors are preferential over batteries for backup power supply 104 due to their longer lifetime. Rechargeable batteries have a limited lifetime and then must be replaced, increasing the operational expense of the equipment.

Memory 117 is high-performance, low latency memory such as DRAM. Other alternatives can also be utilized, such as SRAM, SDRAM, reduced latency DRAM, etc. The key criteria is for low power to minimize the power draw on backup power supply 104 when it is being used. Memory 117 is controlled by memory controller 107. Due to the backup power, memory 117 acts as a non-volatile memory. Memory 117 is preferentially protected via error-correcting code (ECC) to protect the contents against corruption due to soft errors.

Backup non-volatile storage 116 is used to provide longer lasting backup storage for memory 117. This storage is only utilized during a power failure of both feeds 101 and 102 (or removal of external power to non-volatile storage engine 54 for any reason) in order to store an image of memory 117. In this way, protected power feed 105 is only required to be used for a short period of time, as explained further below. Backup non-volatile storage 116 is controlled by storage interface 109. Preferentially, backup non-volatile storage 116 is a Flash Disk (Flash EEPROM), but other non-volatile technology can be used in place, such as a disk drive, magnetic RAM (MRAM), ferroelectric RAM (FeRAM), or Ovonic Unified Memory (OUM). Preferentially, the backup-non volatile storage is removable from the non-volatile storage engine 54, such that in the event of a complete failure of the card, and if a mate router is also not available, the messages stored on the card can be recovered.

Backup logic 108 is used to copy the contents of memory 117 to backup non-volatile storage 116 when the power feeds 101 and 102 have both failed and power is only available from backup power supply 104. In this way, backup power supply 104 only needs to power blocks 117, 107, 108, 109 and 116 for the duration of time needed to copy the memory 117 to backup non-volatile storage 116. This allows the backup power supply 104 to only require a small capacity.

System interface 111 couples the assured deliver engine 54 to the system communication bus 45. For example, if the communications bus 45 is a PCI-X bus, then the system interface 111 is a PCI-X interface. This allows the processor 42, or a DMA engine 260, to transfer data to and from the non-volatile storage engine 54, and also allows the non-volatile storage engine to transfer data to and from the memory 41. In a similar manner, the non-volatile storage engine can also communicate with other system components over communications bus 45.

The control logic 110 controls the overall operation of the assured delivery card 54 under normal operation, and is described further below.

Link interface 112 allows the non-volatile storage engine to communicate with the mate non-volatile storage engine 56, via a dual physical layer interface block 113, which in turn interfaces with two ports 114 and 115, which in turn connect to redundant links 55. Ports 114 and 115 preferentially use small form-factor pluggable modules, to allow the interface to be selected between copper and optical interfaces, and to allow the ports to be swapped out if failed.

The operation of non-volatile storage engine 54 in the context of assured delivery of messages in network 2 is now described. For a description of the operation of an exemplary network-wide assured delivery service, to which this invention can be applied, refer to co-filed U.S. patent application 60/745,456, the contents of which are incorporated herein by reference. Note that the non-volatile storage engine 54 can be utilized in other ways to achieve an assured delivery service.

Figure 5:
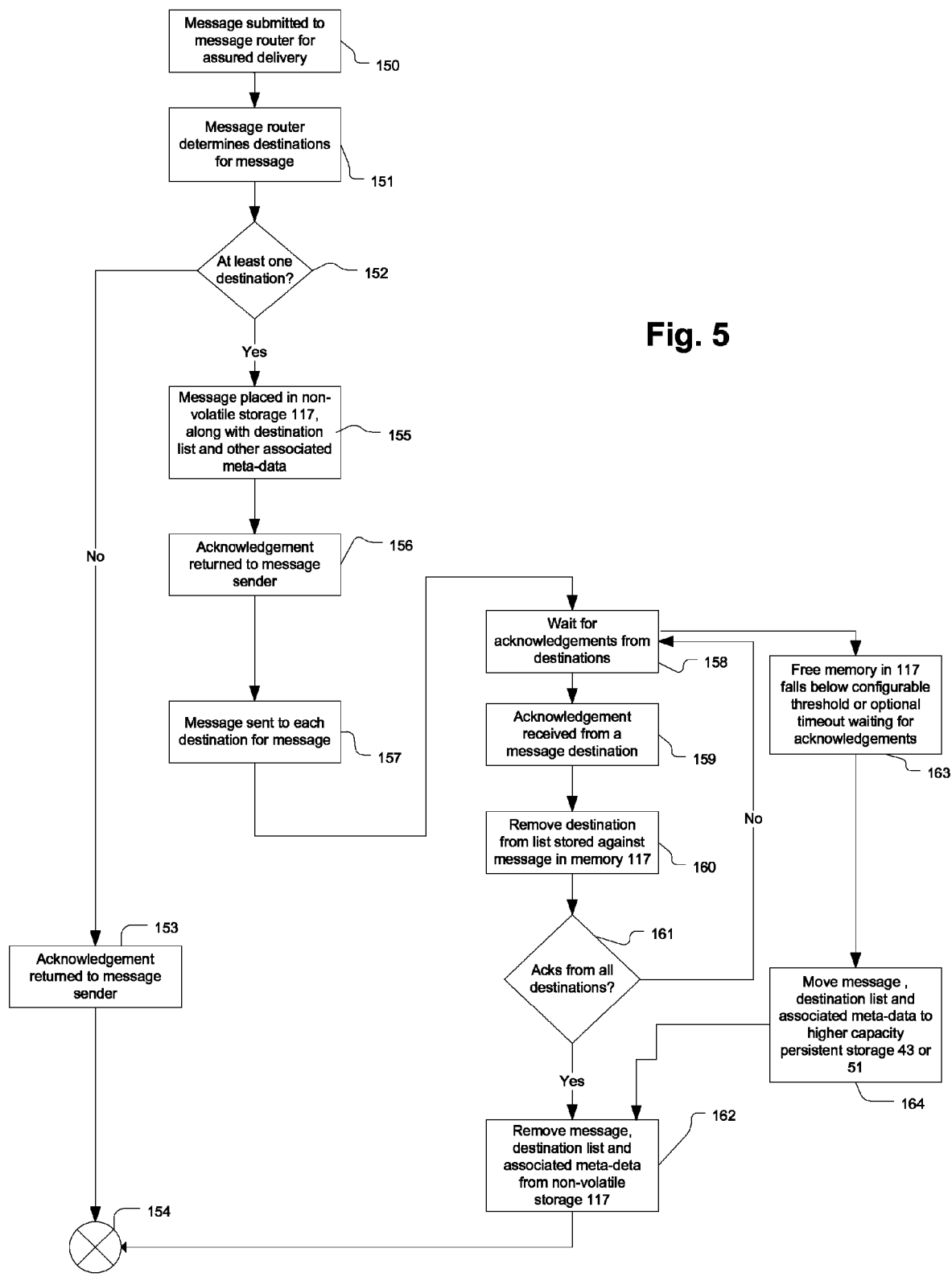
FIG. 5 shows processing logic for handling an assured delivery message.

When content router 40 receives a message which it must deliver in an assured manner, it must first ensure that the message is stored in a guaranteed persistent manner before acknowledging the message to the sender. In this way, the message router 40 will take responsibility for the delivery of the message in an assured manner, and the sender, once an acknowledgement is received, can assume that the message will be delivered without loss. The processing logic used by message router 40 is shown in FIG. 5.

Message router 40 receives a message for assured delivery at step 150. It first determines the required set of recipients for the message at step 151, either via the destination queue that has been specified, or by determining the set of recipients based on destination topic or topics for the message (through subscriptions to the topic(s)), or by examining the content of the message and determining the set of recipients interested in the content of the message, using the content matching and forwarding engine 46, or via a set of recipients explicitly indicated by the message sender, or by any other means. Message router 40 can also have other meta-data associated with the message, such as message length, message priority, sequence number, expiry time, etc., which may have been included with the message from the message sender, or may be determined by message router 40, or a combination. At step 152, a check is made to see if there are any destinations for the message. If not, step 153 is reached, where an acknowledgement is returned to the message sender, and processing completes at step 154.

If there is at least one destination at step 152, then step 155 is reached, where the message is placed into non-volatile storage, along with the destination list and other associated meta-data. This is done using the non-volatile storage engine 54, as described below. Once the assured delivery message (and associated meta-data and destination list) is in non-volatile memory 117 on non-volatile storage engine 54, step 156 is reached, and an acknowledgement is sent to the message sender to indicate that the message router 40 has now taken responsibility for the message and will deliver it to any required destinations. At step 155, the non-volatile storage engine 54, when storing data into memory 117, also sends the data across link(s) 55 to the mate non-volatile storage engine 56 for storage in its memory 117. This replication is automatically carried out by control logic 110, freeing up the processor 42 from this task.

At step 157, the message is sent to required next-hop destinations. Note that where possible the message will remain in memory 41 and be delivered to any next hop destinations from memory 41. In the preferred case, the message will never need to be retrieved from memory 117. Even with the assistance of DMA engine 260 message transfer across system bus 45 is relatively expensive. In the example stated previously (FIG. 1), with respect the message router 3, a copy of the message is delivered to client 30, and a copy is delivered to message router 5 for onwards delivery to message routers 4 and 10.

At step 158, message router 40 waits for an acknowledgment from each entity to which it sent a copy of the message.

At step 159, an acknowledgement is received for the message from a given destination. This leads to step 160, which removes that destination from the list which is maintained against the message (described above in step 155) in memory 117. Then, at step 161, a check is performed to see if an acknowledgement has now been received for all destinations. If not, step 158 is reached to wait for further acknowledgements. When all acknowledgements for the message have been received, step 162 is reached, where the messages and the associated meta-data can be removed from non-volatile storage 117, and then the process completes at step 154. It should be noted at step 162, the resources can be immediately freed from memory 117 for the message and associated data, or the resources can be freed as a background operation.

At step 158, if a timeout occurs when waiting for all the acknowledgements for the message to arrive, indicating that all the acknowledgements have not been received in a small period of time, such as four seconds, then step 163 is reached. This indicates that at least one message recipient is not acknowledging the message in a timely manner, and thus delivery of this particular message will not be finalized to all recipients in a small amount of time. In this case, processing proceeds to step 164, where the message, and the associated destination list and meta-data is moved from memory 117 to a higher-capacity persistent storage 43 or 51. Note that the destination list will only contain the destinations which have not yet acknowledged the message. Then, processing proceeds to step 162 where the message, destination list and associated meta-data can be removed from memory 117 as described above. Then, the process completes at step 154.

Step 163 and step 164 can alternatively be triggered by the amount of free memory resources in memory 117 falling below a configurable threshold rather than being based on a timeout waiting for acknowledgements. That is, messages that have not been fully acknowledged can reside in memory 117 for an extended period of time as long as memory 117 has sufficient free resources to handle newly published messages.

The above-described flow is only with respect to a single message, and the message router 40 performs such logic for many messages in parallel.

Thus, as described in FIG. 5, persistent messages and associated data are stored temporarily in non-volatile memory 117, which can be done with consistently very low latency and with very high throughput, due to the high memory bandwidth of memory 117 and the high bandwidth of communications bus 45. However, memory 117 has limited capacity, and thus if a given message is not acknowledged by all recipients in a timely manner, the message and associated data is migrated to a higher-capacity persistent storage. This migration does not affect the delivery latency to recipients who were available to receive the message quickly, and does not affect the publisher of the message as the message has been previously acknowledged to the publisher.

At step 160, as an alternative to removing a destination which has acknowledged the message from the destination list stored in memory 117, other state can be stored in memory 117 for each subscriber, such as the most recently acknowledged message sequence number, which means that that messages and all previous messages sent to that subscriber have been acknowledged. Thus, at step 161, this additional state can be referenced to determine if all the destinations for a particular message have acknowledged receipt of that message.

Figure 6:
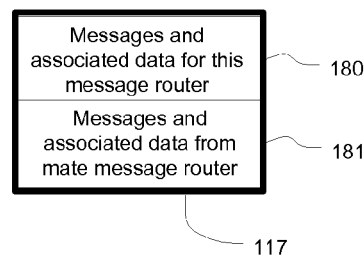
FIG. 6 shows high-level separation of contents of non-volatile memory.

The required capacity of memory 117 can be determined based on the average message size, the desired message rate to be supported, the maximum amount of time for "normal" message delivery, and also accounting for the data replication that occurs between non-volatile storage engine 54 and mate non-volatile storage engine 56. Referring to FIG. 6, non-volatile memory 117 is separated into two parts. The first part 180 stores messages and associated data (destination list and other meta-data or other state data such as per-subscriber and per-publisher state as described above) for the message router 40, while the other part 181 stores messages and associated data and other state information from the mate message router 53. Preferentially, 180 and 181 are of equal size. Segment 180 is controlled by non-volatile storage engine 54, while section 181 is controlled via mate non-volatile storage engine 56 and populated via communications between the two non-volatile storage engines 54 and 56 over link(s) 55.

As an example, given an average assured delivery message size of 1000 bytes, and allowing for 500 bytes for the destination list and associated meta-data for the message, each message requires 1500 bytes of storage in memory 117. Another factor is the maximum amount of time a given message can live in memory 117; an example value being five seconds. A third factor is the expected peak message rate for assured delivery messages which is to be sustained by message router 40. A fourth factor is the doubling of memory required to hold both segments 180 and 181. This yields:

$$= (1000 + 500) \text{ bytes/message} * 60,000 \text{ messages/second} * 5 \text{ seconds} * 2$$

$$= 900,000,000 \text{ bytes}$$

In the above example, memory 117 can be provisioned as 1 Gigabyte of memory. It should be noted that the 5 second time must account for any time required to process received acknowledgements, and to migrate messages and associated data to higher-capacity persistent storage 43 or 51 as needed. If acknowledgements are expected within 3.5 seconds, this gives a further 1.5 seconds for the other operations.

Similarly, the required bandwidth of link 55 in a given direction can be determined by the amount of data that must be transferred between non-volatile storage engines 54 and 56, namely:

$$= (1000 + 500) \text{ bytes/message} * 60,000 \text{ messages/second}$$

$$= 90,000,000 \text{ bytes/second}$$

Some additional overhead must be accounted for any additional framing or other communications protocol overhead between the two engines, as well as messages to update the contents of the memory (i.e. when an acknowledgement is received or when an entry can be freed). In the above example, a link of a Gigabit per second is suitable, and thus a link based on the gigabit Ethernet PHY or similar can be utilized. Note that any type of link protocol may be utilized between the two engines.

Another factor is the memory bandwidth needed into memory 117 from memory controller 107. Memory bandwidth is needed to store messages and associated data from this message router 40 and the mate message router 53, as well as updates to the data structures as destination lists are modified for messages, updates to data structures as messages are removed to free up resources, and bandwidth to copy out any messages and associated data that must be moved onto persistent storage 43 or 51 as explained above. The dominant factor is placing messages into the RAM, the rate of which will be double the 90,000,000 bytes/second computed above (to account for entries from both message routers), plus bandwidth to account for every message being moved back to disk in the worst case. The resulting required bandwidth is low compared to the bandwidth available for memories such as DRAM.

Backup non-volatile storage 116 must be sized to be at least as big as memory 117, for example, 1 Gigabyte as per the calculation above.

Memory 117 can be used to store other state data that needs to be non-volatile, accessed with low-latency and high throughput, and made redundant via synchronization with the mate non-volatile storage engine 56. For example, state can be maintained on a per-publisher basis, such as the last message identifier number received from each publisher. State can also be maintained on a per-subscriber basis, such as the last message identifier number sent to the subscriber, and the last message identifier number acknowledged be the subscriber (which indicates that this message and all previous messages have been acknowledged). Such state information is automatically synchronized to the mate non-volatile storage engine 56 as described above. However, such information may never need to migrate to persistent storage 43 or 51, since by its nature it is of fixed size (as opposed to being based on the number of outstanding messages) and thus a fixed portion of segment 180 and segment 181 can be reserved for this data. If such data is of highly variable size, it can be migrated to external storage 43 or 51 as needed. The memory 117 must be sized to take into account any such usage in addition to the calculation performed above for message storage.

Backup power supply 104 must be sized to support the power draw for the blocks using protected power feed 105 for the duration of the time needed to for backup logic 108 to copy the contents of memory 117 to backup non-volatile storage 116. If block 116 uses technology such as NAND Flash, write speeds of 20 Mbytes per second are available. Given a memory capacity of 1 Gigabyte, this transfer will take 50 seconds. So, backup power supply 104 only has to be sized to power the circuitry for a modest period of time, such as two minutes (to provide an adequate safety margin). It should be noted that only a small amount of circuitry is being protected by power supply 104, as opposed to trying to use an external uninterruptible power supply to protect the entire message router 40.

It should be noted that the non-volatile storage engine 54 can be sized to support higher message rates or larger averages messages sizes by adjusting the size of memory 117, the size of backup non-volatile storage 116, the bandwidth of link(s) 55, and the capacity of backup power supply 104. The communications bus 45 must also have sufficient bandwidth to support the transactions to and from the non-volatile storage engine 54.

Control logic 110 also sends period heartbeat messages over both links 55 to the mate non-volatile storage engine 56, and monitors links 55 for incoming heartbeat messages. This allows each message router to determine whether the mate message router is connected.

Figure 7:
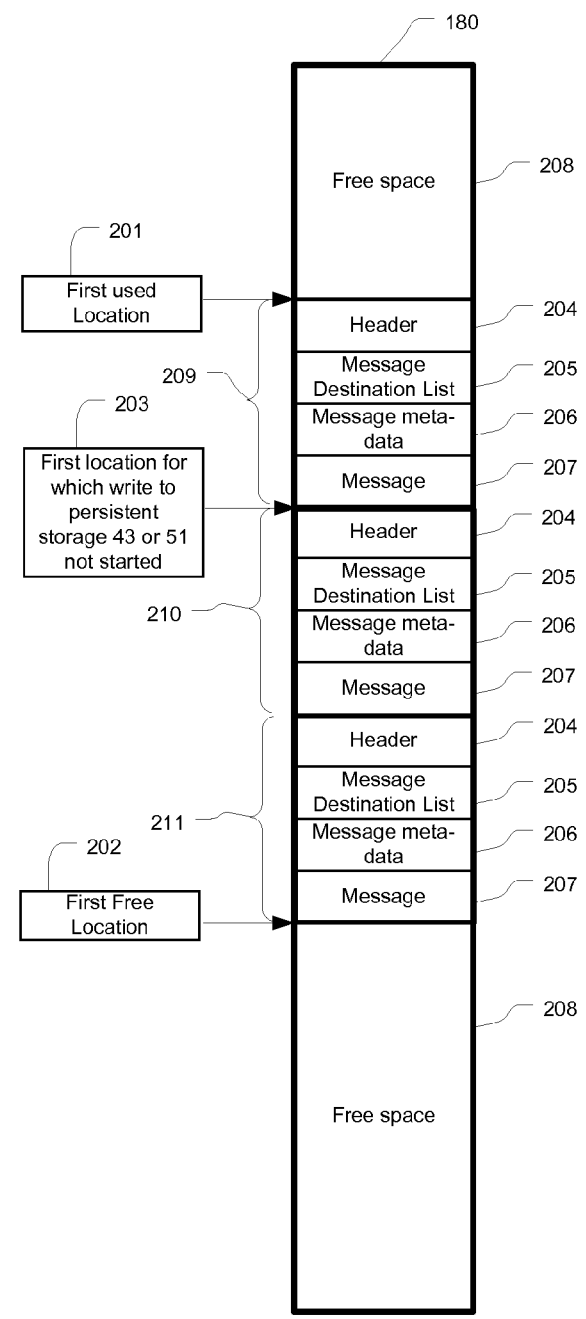
FIG. 7 shows one technique for management of storage in non-volatile memory.

FIG. 7 shows one method for managing the segment 180 in memory 117. While FIG. 7 shows the entire segment 180 being used for messages and associated meta-data, it will be understood that a portion of segment 180 (and 181) can be reserved for other uses, such as state data associated with publishers and subscribers as described above. With this method, arriving messages are kept in a circular queue in segment 180, with the oldest message present pointed by first used location pointer 201, and the first free location in segment 180 pointed to by first free location pointer 202. Thus, the available free area 208 is indicated. In the example, three messages are currently present, namely 209, 210, 211. It will be understood that a very large number of such messages can be present. At step 155, when a new message is to be placed into memory 117, the message is placed starting at the location specified by the first free location pointer 202. The message consists of a header 204, which can contain data such as an overall length of the information block for a message, and can also contain validation information such as a checksum or CRC across the data. In this storage scheme, it is critical that message boundaries are always known even in the case of non-correctable corruption, so duplicate information can be encoded to ensure that messages can always be delineated in memory 117. The destination message list is encoded in field 205, any message meta-data such as message headers or other internal information such as a timestamp of when the message was received is stored in field 206, and the message itself is stored in field 207.

At step 160, when an acknowledgement is received for a given destination and the destination list is to be updated, the message entry is located in memory segment 180 and the destination list of field 205 is updated to show that the destination has acknowledged the message. This can use, for example, an associated flag with each destination in the list to indicate that the destination has acknowledged the message. Or, the destination information can be replaced with a reserved value indicating a null destination.

To locate the message for which an acknowledgement applies, CPU 42 can keep tracking data structures in memory 41 for the location of each message in memory 117, or control logic block 110 can track this structure using internal memory and thus offload CPU 42 from this location task.

Step 162 involves removing messages for which all destinations have acknowledged the message, and step 164 involves moving messages which have not received all acknowledgements in a timely manner to persistent storage 43 or 51. One algorithm which can be utilized is for control logic 110 to periodically scan the stored messages starting at pointer 203, and examining each message in turn to see if the message has been in segment 180 for too long (as per step 163). Alternatively, control logic 110 can perform the scanning operation in response to the available free space 208 falling below a configurable threshold. For each message examined, if all acknowledgements have been received, and there are no previous non-acknowledged messages, pointer 203 (and pointer 201 if equal to pointer 203) can be advanced to free up the space. When a message is found that has been waiting too long for all acknowledgements, logic DMA engine 260 transfers the messages and associated data from memory 117 to memory 41, and then informs processor 42 (e.g. via an interrupt or other such means) of the presence of such transferred messages. Pointer 203 is advanced after such a DMA transfer to keep track of which messages have been transferred to memory 41. Processor 42 can then store such messages and related data, in a bulk manner as a group, into storage 43 or 51, and then inform control logic block 110 when such transfer is complete (with such data being physically transferred onto the physical storage medium or onto a non-volatile cache associated with such storage medium). Then, first used location pointer 201 can be advanced to free up memory for all such messages which have been transferred. The process of looking for expired messages (or older messages due to the amount of free space 208 falling below a configurable threshold) can continue until a message is found which has not yet expired, or until free space 208 as grown large enough, or until the first free location pointer 202 is reached.

Note that the decision of when messages need to migrate from memory 117 to storage 43 or 51 can also be made by processor 42 in place of control block 110, or the two units can work together to make the determination.

Note that segment 181 can be utilized in a similar manner, but its contents are remotely managed by the mate non-volatile storage engine 56 to mirror the contents of its segment 180, and vice versa.

The above scheme does not maximize the free space available in segment 180, since a given message slot is not freed up, even if all acknowledgements have been received, until all previous messages have been acknowledged fully or have been transferred to persistent storage 43 or 51.

Figure 8:
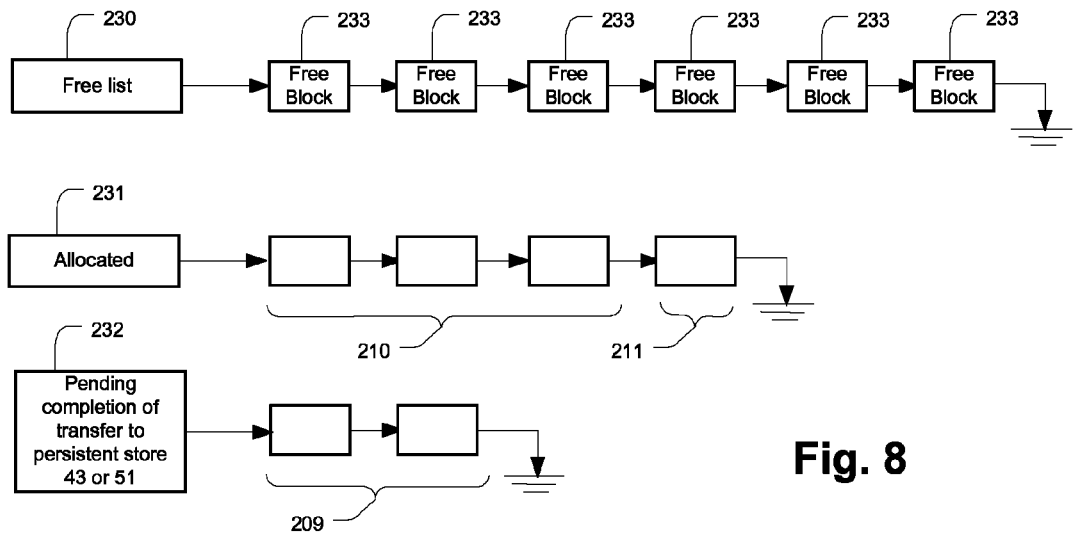
FIG. 8 shows an alternative technique for management of storage in non-volatile memory.

Another example technique is shown in FIG. 8. Segment 180 (or a subset of segment 180 which is allocated for messages storage and associated meta-data) is broken down into a number of allocation blocks 233, and when non-volatile storage engine 54 is first initialized with previously stored states in backup non-volatile storage 116, all such allocation blocks are placed onto the free list 230. Upon a restart of non-volatile engine 54, the state of memory 117 is restored from backup non-volatile storage 116.

At step 155, when a new message and associated data is to be stored, the required number of block needed to store the information are removed from free list 230 and added to the end of allocated list 231, and the information is stored, including portions 204, 205, 206 and 207 described above. At step 162, when a message and associated data is to be removed, due to receiving all acknowledgements for the message or the message having been transferred to non-volatile storage 43 or 51, the associated blocks can be removed from allocated list 231 and placed back onto free list 230, thus immediately freeing up the resources upon the receipt of the last acknowledgement for the message.

For step 163, upon the free list 230 having an amount of free memory which is below a configurable threshold, the allocated list can be scanned to find messages that are too old as described before. The handling of such messages (i.e. DMA into memory 41) is as before, but the associated blocks can be moved onto list 232. As acknowledgment of storage into persistent storage 43 or 51 are received, the blocks in question can then be moved from list 232 onto list 230 and thus freed.

With the technique of FIG. 8, messages can reside in memory 117 for a longer period of time, and only have to be migrated from memory 117 to persistent store 43 or 51 in response to the amount of free memory on free list 230 falling below a threshold. While the technique of FIG. 7 can also trigger a transfer based on the amount of free space 208 falling below a threshold, that technique may not free up memory as quickly since if a message has not been fully acknowledged and thus the associated memory cannot be freed up, the memory for any later messages that have been fully acknowledged cannot be freed up until the preceding unacknowledged message is migrated to storage 43 or 51. In comparison, in the technique of FIG. 8, memory associated with a message can be moved from the allocated list 231 to the free list 230 as soon as all acknowledgements have been received, independently of the state of any other message.

It will be understood that many other techniques can be utilized for management of segment 180.

Figure 9:
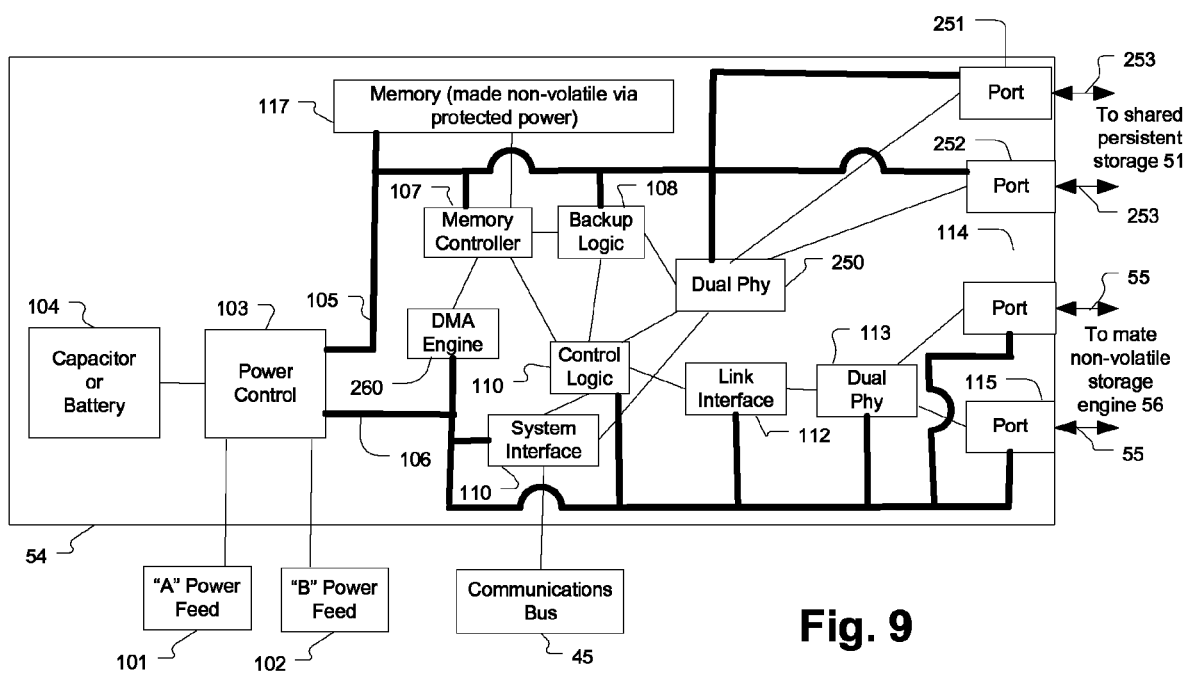
FIG. 9 shows an alternative block diagram of the non-volatile storage engine with interface to external persistent storage incorporated.

FIG. 9 shows an alternative block diagram of the non-volatile storage engine 54 with the interface to shared persistent storage integrated onto the engine, as opposed to being accessed by ports 49 on a different assembly as shown in FIG. 3. Elements in common with FIG. 4 carry the same label and are not described again.

In place of backup non-volatile storage 116, redundant ports 251 and 252 are provided for access to the shared persistent storage 51. Ports 251 and 252 are accessed via the dual physical interface block 250 to provide access to the external storage from backup logic block 108, control logic block 110 and system interface block 111. In this way, the external physical storage remains accessible to CPU 42, and blocks on the assured delivery card 54 can also access storage 51. Blocks 250, 251 and 252 are powered from protected feed 105 so that they continue to function during loss of both power feeds 101 and 102.

When both power feed 101 and 102 fails, backup logic 108 copies the contents of memory 117 to the external persistent storage instead of using Flash EEPROM device. As an option, in order for the backup logic 108 to not have to understand file systems, a portion of the external storage can be reserved as a raw set of disk blocks, allowing backup logic 108 to use a simple method to backup the contents of memory 117.

Additionally, at step 164, the control logic block 110 can directly access persistent storage 51 to manage the movement of messages and associated data from memory 117 to storage 51, instead of processor 42 doing part of the task. It should be noted that even if the scheme of FIG. 9 is utilized, the migration of messages from memory 117 to storage 51 can still be done with the involvement of processor 42 as previously described. As another alternative, control logic 110 can include a CPU with the software logic to control a file system on shared persistent storage 51, allowing non-volatile storage engine 54 to independently access a full file system on storage 51.

It will be appreciated that while the use of the non-volatile storage engine 54 has been described in the context of an assured delivery application, this engine can be used for many other applications. For example, in an apparatus being used to process messages for the Financial Information eXchange (FIX) protocol, there is also a need for very low-latency, high throughput handling of messages, in which messages need to be placed into non-volatile storage in a redundant manner while maintaining the lowest possible latency and highest possible throughput. Non-volatile storage engine 54 can be used in a similar manner to that described above for this purpose, but the meta-data associated with the message will be different. As another example, for processing of stock exchange feeds in a redundant manner, the non-volatile storage engine can be used to efficiently synchronize required non-volatile state between a redundant pair of routers performing such processing.

It will be appreciated that an exemplary embodiment of the invention has been described, and persons skilled in the art will appreciate that many variants are possible within the scope of the invention.

All references mentioned above are herein incorporated by reference.

We claim:

1. A method of providing low latency, high throughput assured message delivery in a network using an non-volatile data storage engine, comprising:
   identifying a set of destinations for a received message;
   storing the received message in a low-latency protected main data storage engine as a memory entry containing information about each destination and other meta-data associated with the message;
   attempting to route the message to each identified destination in said set;
   awaiting an acknowledgement from each identified destination indicating that the message has been successfully received thereby;
   upon receipt of each acknowledgement, updating the memory entry associated with said received message to indicate that the message has been delivered to the destination returning the acknowledgement;
   removing the message from said memory when an acknowledgement has been received from each destination in said set, and
   wherein said data storage engine comprises:

a high performance, low latency volatile main memory;

a memory controller for continually writing data to and retrieving data from said volatile memory;

a power control unit providing a first protected power feed and a second power feed from one or more normal power sources;

an independent back-up power supply with a stored energy reserve for use in the event of failure of said one or more normal power sources connected to said power control unit; and a back-up non-volatile memory; and wherein said first power feed supplies said main memory, said backup non-volatile memory, the memory controller, and a backup logic unit, and said second power feed supplies other components in said data storage engine including a system interface and control logic; and wherein said power control unit monitors the supply of power from said one or more normal power sources and upon detection of a failure in all said one or more normal power sources:

(i) switches the supply of power to the first power feed from said one or normal power sources to said back-up power supply while allowing said second power feed to power down, and (ii) initiates transfer of current data in said main memory to said non-volatile memory, and wherein said back-up power supply is sized to have a sufficient reserve of stored energy to permit the transfer of the contents of said main memory to said non-volatile memory.

2. A method as claimed in claim 1, wherein said data storage engine maintains synchronization with a mate non-volatile storage engine.

3. A method as claimed in claim 1, whereupon after an expiry of a period of time, said message and associated destination list and other meta-data is migrated from said data storage engine to a persistent storage unit to free up space in said data storage engine.

4. A method as claimed in claim 1, wherein upon a threshold being reached of utilized space in said non-volatile memory, said message and associated destination list and other meta-data is migrated from said data storage engine to said persistent storage unit to free up space in said volatile memory.

5. A method as claimed in claim 4, wherein said storage engine forms part of a message router.

6. A method as claimed in claim 5, wherein said persistent storage is shared among several said message routers.

7. A method as claimed in claim 5, wherein said message router is paired with a redundant mate.

8. An assured message delivery engine for use in a network, comprising:

a protected low-latency main data storage engine; and a processor programmed to:

(i) identify a set of destinations for a received message;

(ii) store the received message in a low-latency protected main data storage engine as a memory entry containing information about each destination and other meta-data associated with the message;

(iii) attempt to route the message to each identified destination;

(iv) await an acknowledgement from each identified destination indicating that the message has been successfully received thereby; and (v) upon receipt of each acknowledgement, update the memory entry associated with said received message to indicate that the message has been delivered to the destination returning the acknowledgement;

(vi) remove the message from said data storage engine when an acknowledgement has been received for each destination and wherein said data storage engine comprises:

a high performance, low latency volatile main memory;

a memory controller for continually writing data to and retrieving data from said volatile memory;

a power control unit providing a first protected power feed and a second power feed from one or more normal power sources;

an independent back-up power supply with a stored energy reserve for use in the event of failure of said one or more normal power sources connected to said power control unit; and a back-up non-volatile memory; and wherein said first power feed supplies said main memory, said backup non-volatile memory, the memory controller, a backup logic unit, and said second power feed supplies other components in said data storage engine including a system interface and control logic; and wherein said power control unit is configured to monitor the supply of power from said one or more normal power sources and upon detection of a failure in all said one or more normal power sources to:

(i) switch the supply of power to the first power feed from said one or normal power sources to said back-up power supply while allowing said second power feed to power down, and (ii) initiate transfer of current data in said main memory to said non-volatile memory, and wherein said back-up power supply is sized to have a sufficient reserve of stored energy to permit the transfer of the contents of said main memory to said non-volatile memory.

9. An assured message delivery engine as claimed in claim 8, further comprising a mate data storage engine associated with said main data storage engine, and wherein data in said main storage engine is continually replicated to said mate data storage engine so as to maintain synchronism between said main data storage engine and said mate data storage engine.

10. An assured message delivery engine as claimed in claim 8, wherein upon detection of said failure said power control unit shuts down components of said storage engine not essential to transfer said current data to said non-volatile memory.

11. An assured message delivery engine as claimed in claim 8, wherein said processor is programmed to migrate said message and associated destination list and other meta-data from said data storage engine to a persistent storage unit to free up space in said data storage engine after an expiry of a period of time.

12. An assured message delivery engine as claimed in claim 8, wherein said processor is programmed to migrate said message and associated destination list and other meta-data from said data storage engine to said persistent storage unit to free up space in said data storage engine.

13. An assured message delivery engine as claimed in claim 8, which forms part of a content-based message router.

* * * * *